United States Patent
Jiang et al.

(10) Patent No.: US 10,621,185 B2
(45) Date of Patent: Apr. 14, 2020

(54) METHOD AND APPARATUS FOR RECALLING SEARCH RESULT BASED ON NEURAL NETWORK

(71) Applicant: Beijing Baidu Netcom Science And Technology Co., Ltd., Beijing (CN)

(72) Inventors: Di Jiang, Beijing (CN); Lei Shi, Beijing (CN); Zeyu Chen, Beijing (CN); Jiajun Jiang, Beijing (CN); Rongzhong Lian, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 196 days.

(21) Appl. No.: 15/625,379

(22) Filed: Jun. 16, 2017

(65) Prior Publication Data

US 2018/0121434 A1    May 3, 2018

(30) Foreign Application Priority Data

Oct. 31, 2016 (CN) .......................... 2016 1 0942287

(51) Int. Cl.
*G06F 16/2457* (2019.01)
*G06F 16/33* (2019.01)
(Continued)

(52) U.S. Cl.
CPC .... *G06F 16/24578* (2019.01); *G06F 16/3334* (2019.01); *G06F 16/3347* (2019.01);
(Continued)

(58) Field of Classification Search
None
See application file for complete search history.

(56) References Cited

U.S. PATENT DOCUMENTS

2009/0259651 A1* 10/2009 Tankovich ............ G06F 16/951
2015/0293976 A1* 10/2015 Guo ...................... G06F 16/248
707/706

FOREIGN PATENT DOCUMENTS

CN         104462327 A      3/2015

OTHER PUBLICATIONS

Chinese Patent Application No. 201610942287.9, Office Action dated Jul. 23, 2019, 6 pages.
(Continued)

*Primary Examiner* — Robert W Beausoliel, Jr.
*Assistant Examiner* — Hau Hoang
(74) *Attorney, Agent, or Firm* — Lathrop GPM LLP (57) ABSTRACT

A method and an apparatus for recalling a search result based on a neural network are provided, the method comprising: receiving a query and collecting a plurality of search results corresponding to the query; acquiring a first feature vector corresponding to the query, and acquiring second feature vectors corresponding to titles of the plurality of search results respectively; acquiring similarities between the first feature vector and the second feature vectors respectively, and acquiring semantic matching scores between the query and the plurality of search results respectively according to the similarities; and determining at least one target search result from the plurality of search results according to the semantic marching scores, wherein the at least one target search result is regarded as the search result recalled according to the query.

15 Claims, 6 Drawing Sheets

(51) Int. Cl.
    *G06F 17/16*   (2006.01)
    *G06N 3/08*    (2006.01)
    *G06N 3/02*    (2006.01)
(52) U.S. Cl.
    CPC ............... *G06F 17/16* (2013.01); *G06N 3/08* (2013.01); *G06N 3/02* (2013.01)

(56) References Cited

OTHER PUBLICATIONS

Chinese Patent Application No. 201610942287.9, English translation of Office Action dated Jul. 23, 2019, 6 pages.

\* cited by examiner

S11 — a query is received and a plurality of search results corresponding to the query are collected.

S12 — a first feature vector corresponding to the query is acquired, and second feature vectors corresponding respectively to titles of the plurality of search results are acquired S13 — similarities between the first feature vector and the second feature vectors are acquired respectively, and semantic matching scores between the query and the plurality of search results are acquired respectively according to the similarities S14 — at least one target search result is determined from the plurality of search results according to the semantic marching scores, in which the at least one target search result is regarded as the search result recalled according to the query

Fig. 1

```
┌─────────────────────────────────────────────────────────────────────────────┐
│ a plurality of sample queries are collected, and the titles of a plurality of sample search results │ S201
│     corresponding respectively to the plurality of sample queries are collected                      │
└─────────────────────────────────────────────────────────────────────────────┘
                                         ↓
┌─────────────────────────────────────────────────────────────────────────────┐
│ the segmentation is performed on the plurality of sample queries and the titles of the plurality of │ S202
│ sample search results respectively so as to acquire a plurality of third segments corresponding to  │
│ each of the plurality of sample queries and a plurality of fourth segments corresponding to each    │
│                      of the titles of the plurality of sample search results                        │
└─────────────────────────────────────────────────────────────────────────────┘
                                         ↓
┌─────────────────────────────────────────────────────────────────────────────┐
│    a plurality of third feature components corresponding respectively to the plurality of third    │ S203
│ segments are determined, and a plurality of feature components corresponding to one or more of     │
│ the plurality of fourth segments clicked by a user are determined as fourth feature components     │
│ and a plurality of feature components corresponding to one or more of the plurality of fourth      │
│            segments not clicked by the user are determined as fifth feature components              │
└─────────────────────────────────────────────────────────────────────────────┘
                                         ↓
┌─────────────────────────────────────────────────────────────────────────────┐
│ the plurality of third feature components are added so as to generate third middle feature vectors │ S204
│                    corresponding to the plurality of sample queries respectively                    │
└─────────────────────────────────────────────────────────────────────────────┘
                                         ↓
┌─────────────────────────────────────────────────────────────────────────────┐
│  the plurality of fourth feature components of each of the titles of the plurality of sample search │ S205
│    results are added so as to generate fourth middle feature vectors corresponding to the one or    │
│                  more of the plurality of fourth segments clicked by the user                       │
└─────────────────────────────────────────────────────────────────────────────┘
                                         ↓
┌─────────────────────────────────────────────────────────────────────────────┐
│  the plurality of fifth feature components of each of the titles of the plurality of sample search  │ S206
│ results are added so as to generate fifth middle feature vectors corresponding to the one or more   │
│                   of the plurality of fourth segments not clicked by the user                       │
└─────────────────────────────────────────────────────────────────────────────┘
                                         ↓
┌─────────────────────────────────────────────────────────────────────────────┐
│ third feature vectors corresponding respectively to the plurality of sample queries, fourth feature │
│ vectors corresponding to the one or more of the plurality of fourth segments clicked by the user    │ S207
│ and fifth feature vectors corresponding to the one or more of the plurality of fourth segments not  │
│   clicked by the user output by the preset algorithm are acquired according to the third middle    │
│           feature vectors, the fourth middle feature vectors and the fifth middle feature vectors   │
└─────────────────────────────────────────────────────────────────────────────┘
                                         ↓
┌─────────────────────────────────────────────────────────────────────────────┐
│   first similarities between the third feature vectors and the fourth feature vectors are acquired │ S208
│     respectively, and second similarities between the third feature vectors and the fifth feature   │
│                                vectors are acquired respectively                                    │
└─────────────────────────────────────────────────────────────────────────────┘
                                         ↓
┌─────────────────────────────────────────────────────────────────────────────┐
│  differences between the first similarities and the second similarities are acquired respectively, │ S209
│ and the differences are adjusted by adjusting weights of elements in the third feature vectors, the │
│                 fourth feature vectors and the fifth feature vectors respectively                   │
└─────────────────────────────────────────────────────────────────────────────┘
                                         ↓
┌─────────────────────────────────────────────────────────────────────────────┐
│  adjusted third feature vectors, adjusted fourth feature vectors and adjusted fifth feature vectors │ S210
│   are determined when the differences achieve target values, so as to establish the preset feature  │
│                                              model                                                  │
└─────────────────────────────────────────────────────────────────────────────┘
```

METHOD AND APPARATUS FOR RECALLING SEARCH RESULT BASED ON NEURAL NETWORK

CROSS-REFERENCE TO RELATED APPLICATION

The present application is based upon and claims priority to Chinese Patent Application No. 201610942287.9, filed on Oct. 31, 2016, the entirety contents of which are incorporated herein by reference.

FIELD

The present disclosure relates to an internet technology field, and more particularly to a method and an apparatus for recalling a search result based on a neural network.

BACKGROUND

With the rapid development of internet technology, the function of a search engine becomes stronger. At present, the search engine may recall all of or a part of a plurality of search results corresponding to the query according to the query input by the user. In the related arts, after the search results are recalled, by quantizing the location (such as titles, contents, labels etc.) of the query in the search results, a ratio of hitting words, the quality of search results and the authoritativeness of the search results to obtain hitting character values and performing a linear addition on the hitting character values, scores may be provided for matching relations between the search results recalled and the query respectively, and the search results are ordered according to the scores.

In this way, since the search results recalled according to the query highly dependent on the hitting situation of the query, some search results with a low hitting degree but matching to the intent of the user are screened out by the current score method, leading to a low matching degree between the search result and the query on semantic aspect.

SUMMARY

Embodiments of the present disclosure seek to solve at least one of the problems existing in the related art to at least some extent.

Accordingly, an objective of the present disclosure is to provide a method for recalling a search result based on a neural network. The method may enhance a semantic matching degree between the search result and the query, improve the relevancy between the search result recalled and the query input by the user and satisfy the requirement of the user.

Another objective of the present disclosure is to provide an apparatus for recalling a search result based on a neural network.

Yet another objective of the present disclosure is to provide a device for recalling a search result based on a neural network.

Yet another objective of the present disclosure is to provide a non-transitory computer readable storage medium.

Yet another objective of the present disclosure is to provide a computer program product.

In order to achieve the above objectives, embodiments of a first aspect of the present disclosure provide a method for recalling a search result based on a neural network. The method includes: receiving a query and collecting a plurality of search results corresponding to the query; acquiring a first feature vector corresponding to the query, and acquiring second feature vectors corresponding to titles of the plurality of search results respectively; acquiring similarities between the first feature vector and the second feature vectors respectively, and acquiring semantic matching scores between the query and the plurality of search results respectively according to the similarities; and determining at least one target search result from the plurality of search results according to the semantic marching scores, in which the at least one target search result is regarded as the search result recalled according to the query.

In order to achieve the above objectives, embodiments of a second aspect of the present disclosure provide an apparatus for recalling a search result based on a neural network. The apparatus includes: a receiving module, configured to receive a query and to collect a plurality of search results corresponding to the query; a first acquiring module, configured to acquire a first feature vector corresponding to the query, and to acquire second feature vectors corresponding to titles of the plurality of search results respectively; a second acquiring module, configured to acquire similarities between the first feature vector and the second feature vectors respectively, and to acquire semantic matching scores between the query and the plurality of search results respectively according to the similarities; and a first processing module, configured to determine at least one target search result from the plurality of search results according to the semantic marching scores, in which the at least one target search result is regarded as the search result recalled according to the query.

In order to achieve the above objectives, embodiments of a third aspect of the present disclosure provide a device for recalling a search result based on a neural network, including: a processor; a memory for storing instructions executable by the processor, in which the processor is configured to receive a query and to collect a plurality of search results corresponding to the query; to acquire a first feature vector corresponding to the query, and to acquire second feature vectors corresponding to titles of the plurality of search results respectively; to acquire similarities between the first feature vector and the second feature vectors respectively, and to acquire semantic matching scores between the query and the plurality of search results respectively according to the similarities; and to determine at least one target search result from the plurality of search results according to the semantic marching scores, in which the at least one target search result is regarded as the search result recalled according to the query.

In order to achieve the above objectives, embodiments of a fourth aspect of the present disclosure provide a non-transitory computer readable storage medium for storing one or more instructions that, when executed by the one or more processors of a mobile terminal, cause the mobile terminal to execute the method for recalling a search result based on a neural network. The method includes: receiving a query and collecting a plurality of search results corresponding to the query; acquiring a first feature vector corresponding to the query, and acquiring second feature vectors corresponding to titles of the plurality of search results respectively; acquiring similarities between the first feature vector and the second feature vectors respectively, and acquiring semantic matching scores between the query and the plurality of search results respectively according to the similarities; and determining at least one target search result from the plurality of search results according to the semantic marching scores, in which the at least one target search result is regarded as the search result recalled according to the query.

In order to achieve the above objectives, embodiments of a fifth aspect of the present disclosure provide a computer program product, when the instructions in the computer program product are executed by the processor, executing the method for recalling a search result based on a neural network. The method includes: receiving a query and collecting a plurality of search results corresponding to the query; acquiring a first feature vector corresponding to the query, and acquiring second feature vectors corresponding to titles of the plurality of search results respectively; acquiring similarities between the first feature vector and the second feature vectors respectively, and acquiring semantic matching scores between the query and the plurality of search results respectively according to the similarities; and determining at least one target search result from the plurality of search results according to the semantic marching scores, in which the at least one target search result is regarded as the search result recalled according to the query.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 2 is a flow chart of a method for recalling a search result based on a neural network according to another embodiment of the present disclosure;

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Figure 1:
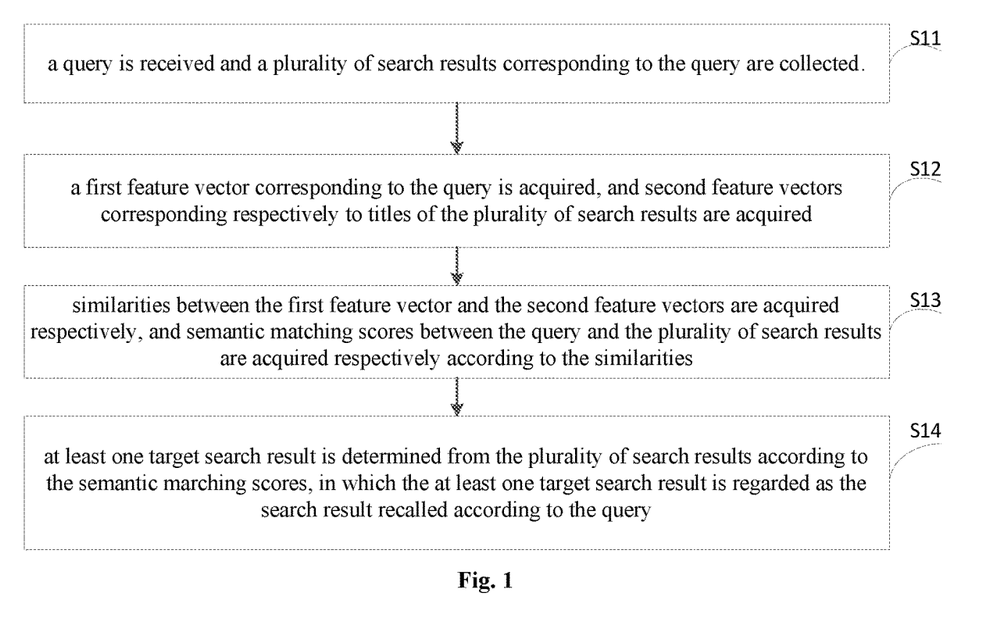
FIG. 1 is a flow chart of a method for recalling a search result based on a neural network according to an embodiment of the present disclosure.

FIG. 1 is a flow chart of a method for recalling a search result based on a neural network according to an embodiment of the present disclosure.

In this embodiment, the method for recalling a search result based on a neural network is provided in an apparatus recalling a search result based on a neural network.

The method may be applied in a search engine of an electric device.

Search Engine is defined as a system based on a certain strategy, which can receive a query input by a user, collect information related to the query from the Internet, and show the information related to the query to the user. That is, the search engine can provide searching service for the user after performing the information organization and processing.

The electric device may be a PC (personal computer), a cloud device or a mobile device (such as a smart phone or a tablet, etc.).

As shown in FIG. 1, the method includes the following acts.

At block S11, a query is received and a plurality of search results corresponding to the query are collected.

In this embodiment, a user may input the query in a search box of a search engine. The plurality of search results corresponding to the query are search results related to the query and collected by the search engine from a cloud server according to certain strategies and using certain computer programs.

A number of the search results may be one or at least two. It may be understood that there are more than one search result because of various information on the internet.

After the query is input by the user, the search engine may transmit the query to a background system, in which the background system may be a server of the search engine.

Search results related to the query may be retrieved in a database of the cloud server after the query is received by the server of the search engine, or, the search results may be crawled in a pre-determined website after the query is received by the server of the search engine, which will not be limited in the present disclosure.

The database of the cloud server is pre-established, for example, in a statistic way.

For example, search behaviors of users on the search engine may be counted by background crews, and the search results corresponding to the query searched for many times may be stored in the database.

Alternatively, the database may be established in a machine learning method. For example, webpage related technology such as web crawler technology may be used, such that the search results corresponding to the query searched for many times may be obtained and stored in the database.

In some embodiments, as shown in FIG. 2, before block S11, following acts may be performed to establish the preset feature model.

At block S201, a plurality of sample queries are collected, and the titles of a plurality of sample search results corresponding respectively to the plurality of sample queries are collected.

Alternatively, in a practical search process, a semantic matching relation may be represented as a relation between the query input in the search engine by the user and a title of the search results.

For example, the query is "12306", the title of the search result corresponding to the query is "Chinese railway customer service center", and thus there is a certain semantic relation between "12306" and "Chinese railway customer service center".

Therefore, a plurality of sample queries may be collected, and the titles of a plurality of sample search results corresponding to the plurality of sample queries may be collected respectively, such that the preset feature model may be established and the semantic features of a sentence may be learned thereafter. Thus, a first feature vector corresponding to the query is required and second feature vectors corresponding respectively to titles of the plurality of search results are acquired.

At block S202, the segmentation is performed on the plurality of sample queries and the titles of the plurality of sample search results respectively so as to acquire a plurality of third segments corresponding to each of the plurality of sample queries and a plurality of fourth segments corresponding to each of the titles of the plurality of sample search results.

Alternatively, the segmentation is performed on the plurality of sample queries and the titles of the plurality of sample search results respectively using related technology, such that a plurality of third segments corresponding to each of the plurality of sample queries and a plurality of fourth segments corresponding to each of the titles of the plurality of sample search results are acquired.

At block S203, a plurality of third feature components corresponding respectively to the plurality of third segments are determined, and a plurality of feature components corresponding respectively to one or more of the plurality of fourth segments clicked by a user are determined as fourth feature components and a plurality of feature components corresponding respectively to one or more of the plurality of fourth segments not clicked by the user are determined as fifth feature components.

For example, original feature components of the segments are trained according to the preset feature model to obtain feature components, in which the original feature components of the segments may be acquired using related technology.

At block S204, the plurality of third feature components are added so as to generate third middle feature vectors corresponding to the plurality of sample queries respectively.

Alternatively, elements of the third feature components may be added, such that the third middle feature vectors corresponding respectively to the plurality of sample queries are acquired.

At block S205, the plurality of fourth feature components of each of the titles of the plurality of sample search results are added so as to generate fourth middle feature vectors corresponding to the one or more of the plurality of fourth segments clicked by the user.

Alternatively, elements of the plurality of fourth feature components of each of the titles of the plurality of sample search results are added, such that the fourth middle feature vectors corresponding to the one or more of the plurality of fourth segments clicked by the user are generated.

At block S206, the plurality of fifth feature components of each of the titles of the plurality of sample search results are added so as to generate fifth middle feature vectors corresponding to the one or more of the plurality of fourth segments not clicked by the user.

Alternatively, elements of the plurality of fifth feature components of each of the titles of the plurality of sample search results are added, such that the fifth middle feature vectors corresponding to the one or more of the plurality of fourth segments not clicked by the user are generated.

At block S207, third feature vectors corresponding respectively to the plurality of sample queries, fourth feature vectors corresponding to the one or more of the plurality of fourth segments clicked by the user and fifth feature vectors corresponding to the one or more of the plurality of fourth segments not clicked by the user output by the preset algorithm are acquired according to the third middle feature vectors, the fourth middle feature vectors and the fifth middle feature vectors.

In this embodiment, the preset algorithm may be preset by a build-in program in the search engine.

Alternatively, the preset algorithm may include a first algorithm and a second algorithm, in which the first algorithm is configured to perform a nonlinear conversion on elements in the feature vectors, and the second algorithm is configured to multiply the nonlinear conversed feature vectors by the a full connectivity matrix.

Specifically, the nonlinear conversion is performed on the elements of the third middle feature vectors using the preset algorithm, and the nonlinear conversed third middle feature vectors are generated according to the processed elements. The full connectivity matrix in the preset algorithm is multiplied by the nonlinear conversed third middle feature vectors and the products are regarded as the third feature vectors corresponding respectively to the plurality of sample queries.

The nonlinear conversion is performed on the elements of the fourth middle feature vectors using the preset algorithm, and the nonlinear conversed fourth middle feature vectors are generated according to the processed elements. The full connectivity matrix in the preset algorithm is multiplied by the nonlinear conversed fourth middle feature vectors and the products are regarded as the fourth feature vectors corresponding to the fourth segments clicked by the user.

The nonlinear conversion is performed on the elements of the fifth middle feature vectors using the preset algorithm, and the nonlinear conversed fifth middle feature vectors are generated according to the processed elements. The full connectivity matrix in the preset algorithm is multiplied by the nonlinear conversed fifth middle feature vectors and the products are regarded as the fifth feature vectors corresponding to the fourth segments not clicked by the user.

At block S208, first similarities between the third feature vectors and the fourth feature vectors are acquired respectively, and second similarities between the third feature vectors and the fifth feature vectors are acquired respectively.

In this embodiment, the first similarities and the second similarities are cosine similarities.

Alternatively, the first similarities represent similarities between the third feature vectors and the fourth feature vectors respectively, such as Positive title; the second similarities represent similarities between the third feature vectors and the fifth feature vectors respectively, such as Negative title.

At block S209, differences between the first similarities and the second similarities are acquired respectively, and the differences are adjusted by adjusting weights of elements in the third feature vectors, the fourth feature vectors and the fifth feature vectors respectively.

Alternatively, subtraction is performed on the first similarities and the second similarities to acquire the differences, such as Positive title−Negative title.

For example, a difference between Positive title and Negative title may be adjusted by adjusting weights of elements in the third feature vectors, the fourth feature vectors and the fifth feature vectors respectively, so as to acquire a maximum absolute value of the difference between Positive title and Negative title (i.e., |Positive title−Negative title| is maximized), which means that the differences between the fourth feature vectors corresponding to the fourth segments clicked by the user and the fifth feature vectors corresponding to the fourth segments not clicked by the user may be maximized.

At block S210, adjusted third feature vectors, adjusted fourth feature vectors and adjusted fifth feature vectors are determined when the differences achieve target values, so as to establish the preset feature model.

In this embodiment, the differences between the first similarities and the second similarities may be adjusted to acquire maximized differences as the target values.

The preset feature model is established according to the adjusted third feature vectors, the adjusted fourth feature vectors and the adjusted fifth feature vectors when the differences achieve target values so as to improve the semantic matching degrees between the query and the search results.

In this embodiment, the semantic matching degrees between the query and the search results may be improved by establishing the preset feature model in advance.

At block S12, a first feature vector corresponding to the query is acquired, and second feature vectors corresponding respectively to titles of the plurality of search results are acquired.

In this embodiment, a segmentation may be performed on the query and the titles of the plurality of search results respectively so as to acquire a plurality of first segments corresponding to the query and a plurality of second segments corresponding to each of the titles of the plurality of search results; a plurality of first feature components corresponding to the plurality of first segments respectively may be determined according to a preset feature model, and a plurality of second feature components corresponding to the plurality of second segments respectively may be determined according to the preset feature model; the plurality of first feature components are added so as to generate a first middle feature vector corresponding to the query; the plurality of second feature components are added so as to generate second middle feature vectors corresponding to the titles respectively; and the first feature vector and the second feature vectors output by a preset algorithm may be acquired according to the first middle feature vector and the second middle feature vectors.

Figure 3:
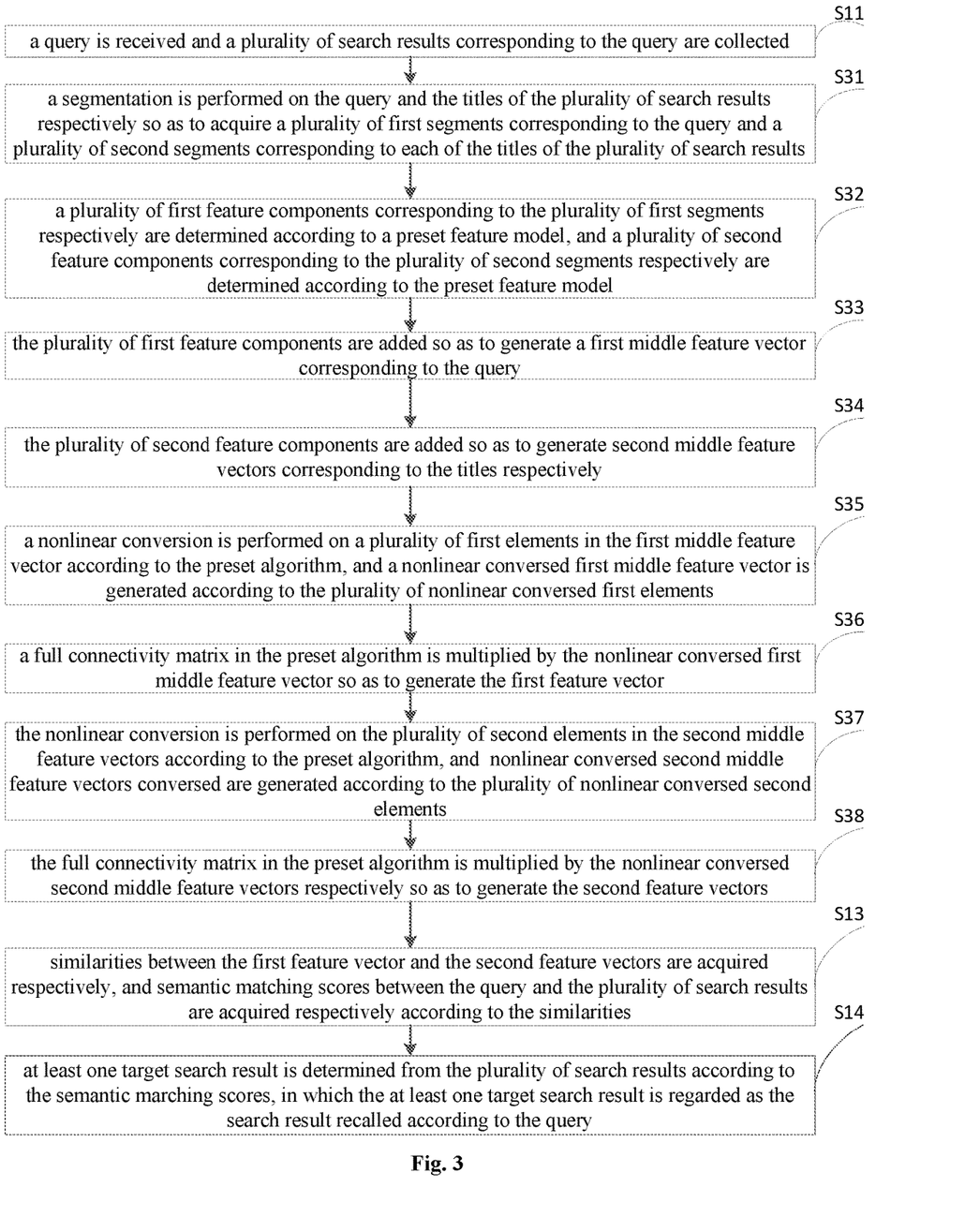
FIG. 3 is a flow chart of a method for recalling a search result based on a neural network according to yet another embodiment of the present disclosure.

In some embodiments, as shown in FIG. 3, block S12 further includes following acts.

At block S31, a segmentation is performed on the query and the titles of the plurality of search results respectively so as to acquire a plurality of first segments corresponding to the query and a plurality of second segments corresponding to each of the titles of the plurality of search results.

Alternatively, the segmentation may be performed on the query and the titles of the plurality of search results respectively and the plurality of first segments corresponding to the query and a plurality of second segments corresponding to each of the titles of the plurality of search results may be acquired by using related technology.

At block S32, a plurality of first feature components corresponding to the plurality of first segments respectively are determined according to a preset feature model, and a plurality of second feature components corresponding to the plurality of second segments respectively are determined according to the preset feature model.

The preset feature model is established in advance.

At block S33, the plurality of first feature components are added so as to generate a first middle feature vector corresponding to the query.

Alternatively, elements of the first feature components may be added so as to acquire added first feature components as the first middle feature vectors corresponding to the query.

At block S34, the plurality of second feature components are added so as to generate second middle feature vectors corresponding to the titles respectively.

Alternatively, elements of the second feature components may be added so as to acquire added second feature components as the second middle feature vectors corresponding to the titles respectively.

At block S35, a nonlinear conversion is performed on a plurality of first elements in the first middle feature vector according to the preset algorithm, and a nonlinear conversed first middle feature vector is generated according to the plurality of nonlinear conversed first elements.

In this embodiment, the preset algorithm may be preset by a build-in program in the search engine.

At block S36, a full connectivity matrix in the preset algorithm is multiplied by the nonlinear conversed first middle feature vector so as to generate the first feature vector.

In this embodiment, the full connectivity matrix in the preset algorithm is multiplied by the nonlinear conversed first middle feature vector and the product is regarded as the first feature vector. The first feature vector may be used to represent a representation of the query corresponding to the first middle feature vector based on the sememe rather than based on the text, such that the credibility may be enhanced.

At block S37, the nonlinear conversion is performed on the plurality of second elements in the second middle feature vectors according to the preset algorithm, and nonlinear conversed second middle feature vectors are generated according to the plurality of nonlinear conversed second elements. At block S38, the full connectivity matrix in the preset algorithm is multiplied by the nonlinear conversed second middle feature vectors respectively so as to generate the second feature vectors.

In this embodiment, the full connectivity matrix in the preset algorithm is multiplied by the nonlinear conversed second middle feature vectors and the products are regarded as the second feature vectors. The second feature vectors may be used to represent a representation of the titles corresponding to the second middle feature vectors based on the sememe rather than only based on the text, such that the credibility may be enhanced.

In this embodiment, the first feature vector corresponding to the query is acquired, and the second feature vectors corresponding respectively to titles of the plurality of search results are acquired, such that semantic matching scores between the query and the plurality of search results may be acquired respectively according to the similarities between the first feature vector and the second feature vectors respectively, thus enhancing semantic matching degrees between the search results and the query, and improving relevancies between the search results recalled and the query input by the user.

At block S13, similarities between the first feature vector and the second feature vectors are acquired respectively, and semantic matching scores between the query and the plurality of search results are acquired respectively according to the similarities.

In this embodiment, similarities between the first feature vector and the second feature vectors may be computed respectively, and the similarities may be regarded as the semantic matching scores between the query and the plurality of search results respectively.

Figure 4:
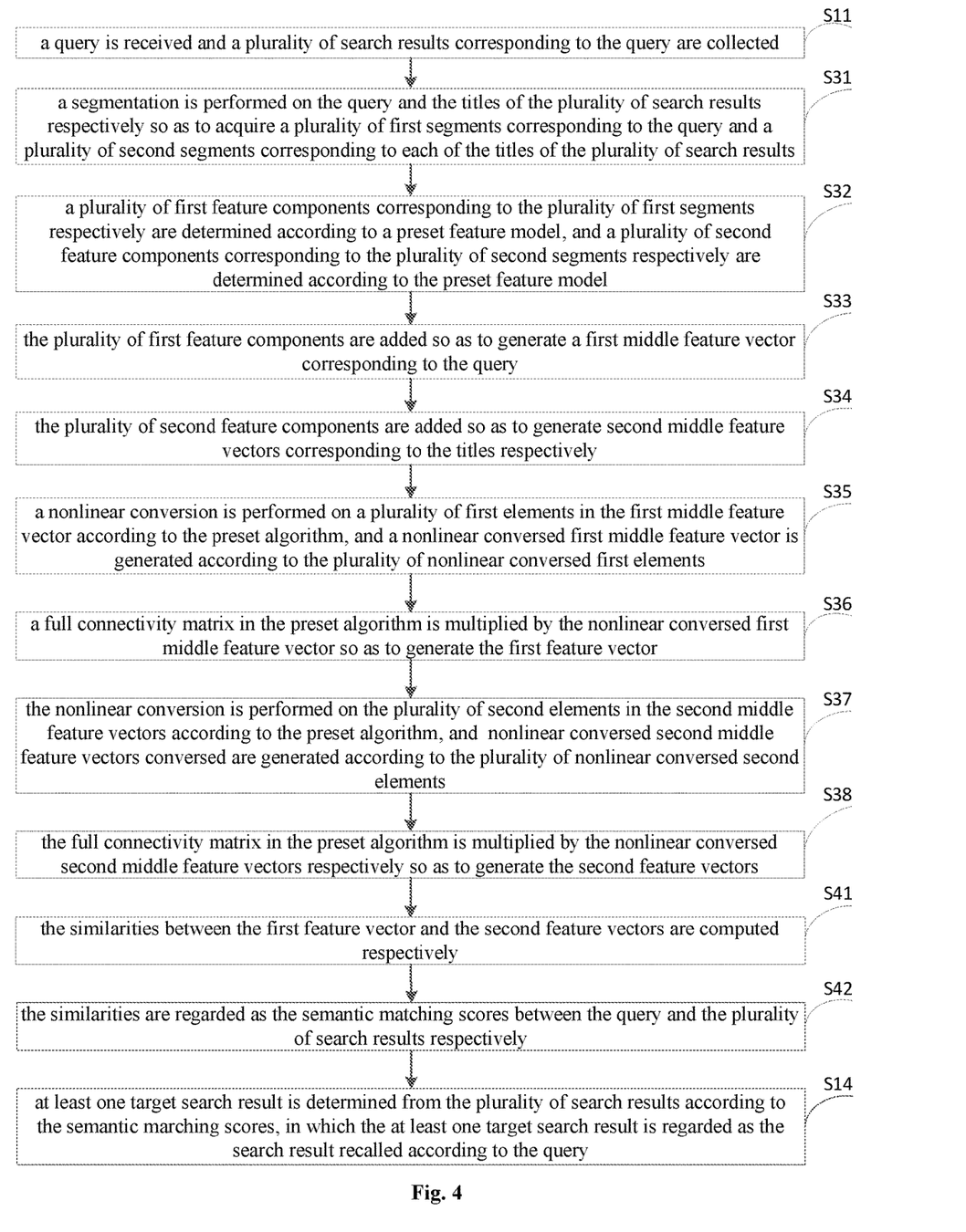
FIG. 4 is a flow chart of a method for recalling a search result based on a neural network according to a still embodiment of the present disclosure.

In some embodiments, as shown in FIG. 4, block S13 further includes following acts.

At block S41, the similarities between the first feature vector and the second feature vectors are computed respectively.

Alternatively, the similarities between the first feature vector and the second feature vectors are computed so as to acquire computing results such as F_neural_1, F_neural_2, . . . , F_neural_n, in which n indicates the number of the second feature vectors.

At block S42, the similarities are regarded as the semantic matching scores between the query and the plurality of search results respectively.

Alternatively, the semantic matching scores between the query and the plurality of search results may be F_neural_1, F_neural_2, . . . , F_neural_n.

In this embodiment, the similarities between the first feature vector and the second feature vectors are computed, and the similarities are regarded as the semantic matching scores between the query and the plurality of search results, such that the semantic matching degrees between the query and the plurality of search results and the relevancy between the search result recalled and the query input by the user may be improved.

At block S14, at least one target search result is determined from the plurality of search results according to the semantic marching scores, in which the at least one target search result is regarded as the search result recalled according to the query.

In this embodiment, the semantic matching scores are regarded as the input of the ordering model, and the scores corresponding to the search results respectively output by the ordering model may be acquired. The plurality of search results are ordered according to the scores so as to determine a preset number of search results as the at least one target search result.

Figure 5:
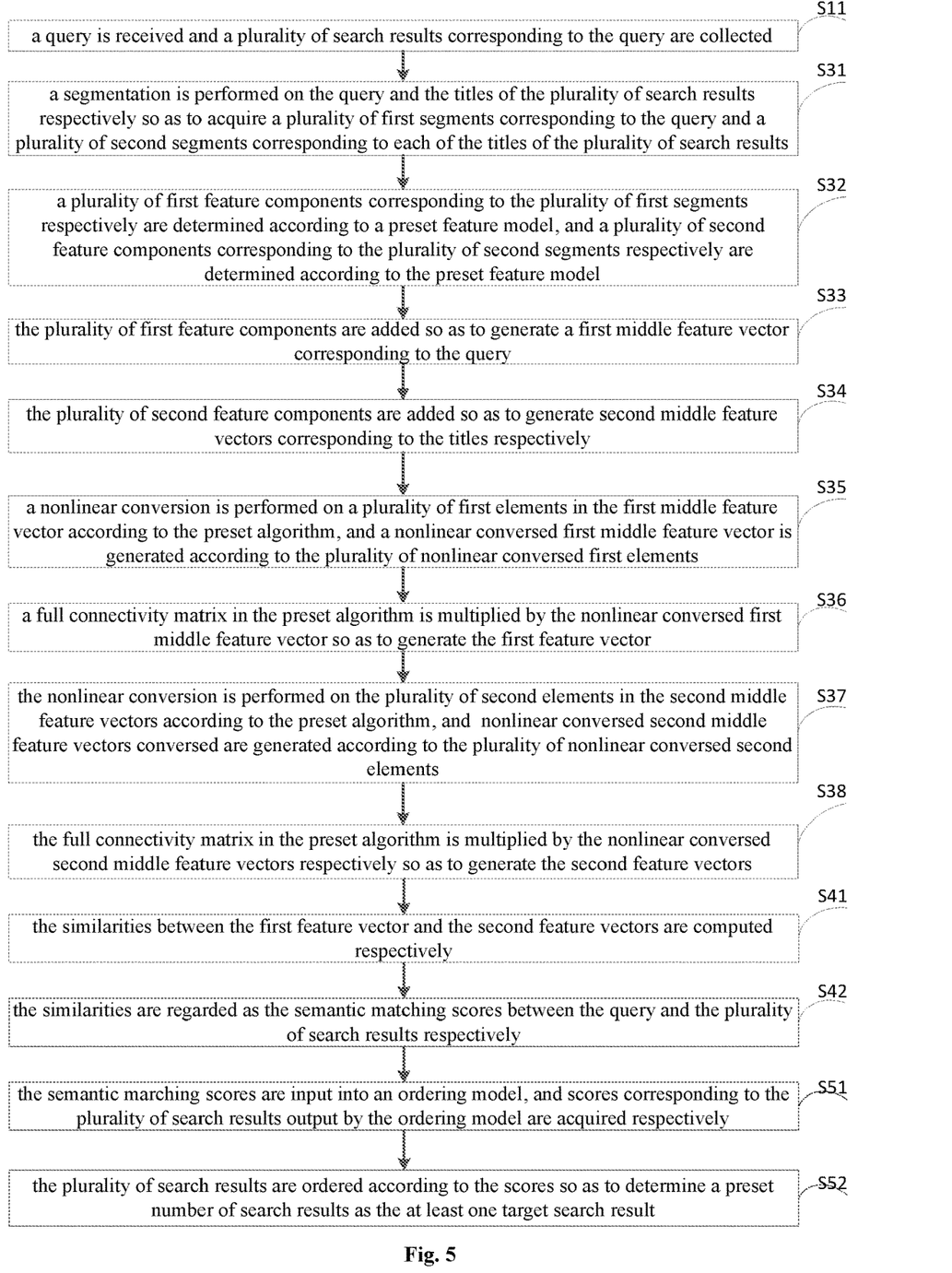
FIG. 5 is a flow chart of a method for recalling a search result based on a neural network according to still another embodiment of the present disclosure.

In some embodiments, as shown in FIG. 5, block S14 further includes the following acts.

At block S51, the semantic marching scores are input into an ordering model, and scores corresponding to the plurality of search results output by the ordering model are acquired respectively.

Alternatively, the scores corresponding to the plurality of search results output by the ordering model are acquired according to related feature values (such as F_1, F_2, . . . , F_n) of the hit search results of traditional query and the semantic matching scores (such as F_neural_1, F_neural_qj2, . . . , F_neural_n) between the search results and the query.

For example, the scores corresponding to the plurality of search results output by the ordering model are acquired according to the following equation.

$$New\_Score_i = \alpha_1 * F\_1 + \alpha_2 * F\_2 + \ldots + \alpha_n * F\_n + \beta_i * F\_neural\_i,$$

where $New\_Score_i$ are the scores corresponding to the search results output by the ordering model, $i=1, 2, \ldots, n$, $\alpha_1, \alpha_2, \ldots, \alpha_n$ are weights corresponding to F_neural_1, F_neural_2, . . . , F_neural_n respectively, $\beta_i$ is the weight corresponding to F_neural_i.

At block S52, the plurality of search results are ordered according to the scores so as to determine a preset number of search results as the at least one target search result.

In this embodiment, the preset number may be preset by the user. By presetting the number of the search results according to the personal requirement, the feasibility and flexibility of the method may be improved efficiently.

As an example, comparison between the search results recalled by the traditional webpages and the search results recalled by the method provided by the present disclosure is shown in Table 1.

TABLE 1

| query | search results recalled by traditional webpages (titles of the search results) | search results recalled by the method provided by the present disclosure (titles of the search results) |
|---|---|---|
| How to write a personal loan with a house as mortgage | someone borrows money from me; with a house as mortgage; how to write a loan_Baidu Knows | an example of a personal loan contract with a house as mortgage_Baidu library |
| how many categories of concrete | could concrete replace wooden components_Baidu Post Bar | versions, ingredients and applications of concrete_Baidu Knows |
| webview unfolding and folding | a method of controlling the webpage layer to unfold and fold by JavaScript - CodeWeblog.com | Android-Webview supports scaling and hiding annoying scaling control bar - Sky of rain Ⓓ regression - Block Channel - CSDN.NET |

As shown in Table 1, the search results are ordered according to the scores corresponding thereto, and the preset number of search results are determined as the at least one target search result, such that semantic matching degrees between the search results and the query may be enhanced, relevancies between the search results recalled and the query input by the user may be improved, and the requirements of the user may be satisfied, and the experiences of user may be improved.

In this embodiment, the semantic marching scores are used as input into the ordering model, scores corresponding to the plurality of search results respectively output by the ordering model are acquired, the plurality of search results are ordered according to the scores so as to determine a preset number of search results as the at least one target search result. Thus, semantic matching degrees between the search results and the query may be enhanced, relevancies between the search results recalled and the query input by the user may be improved, and the requirements of the user may be satisfied.

In this embodiment, a first feature vector corresponding to the query is acquired, second feature vectors corresponding respectively to titles of the plurality of search results are acquired, similarities between the first feature vector and the second feature vectors are acquired respectively, semantic matching scores between the query and the plurality of search results are acquired respectively according to the similarities, and at least one target search result from the plurality of search results is determined according to the semantic marching scores, in which the at least one target search result is regarded as the search result recalled according to the query. Thus, semantic matching degrees between the search results and the query may be enhanced, relevancies between the search results recalled and the query input by the user may be improved, and the requirements of the user may be satisfied.

Figure 6:
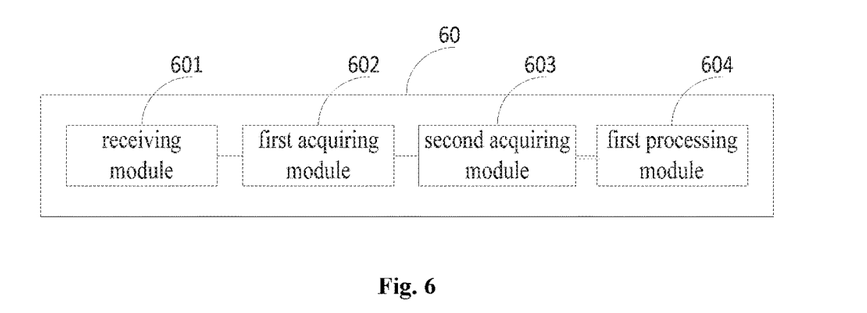
FIG. 6 is a block diagram of an apparatus for recalling a search result based on a neural network according to an embodiment of the present disclosure.

FIG. 6 is a block diagram of an apparatus for recalling a search result based on a neural network according to an embodiment of the present disclosure. The apparatus 60 may be realized by software, hardware or a combination thereof.

As shown in FIG. 6, the apparatus 60 includes a receiving module 601, a first acquiring module 602, a second acquiring module 603 and a first processing module 604.

The receiving module 601 is configured to receive a query and to collect a plurality of search results corresponding to the query.

The first acquiring module 602 is configured to acquire a first feature vector corresponding to the query, and to acquire second feature vectors corresponding to titles of the plurality of search results respectively.

The second acquiring module 603 is configured to acquire similarities between the first feature vector and the second feature vectors respectively, and to acquire semantic matching scores between the query and the plurality of search results respectively according to the similarities.

Alternatively, the similarities, the first similarities and the second similarities are cosine similarities.

The first processing module 604 is configured to determine at least one target search result from the plurality of search results according to the semantic marching scores, in which the at least one target search result is regarded as the search result recalled according to the query.

Figure 7:
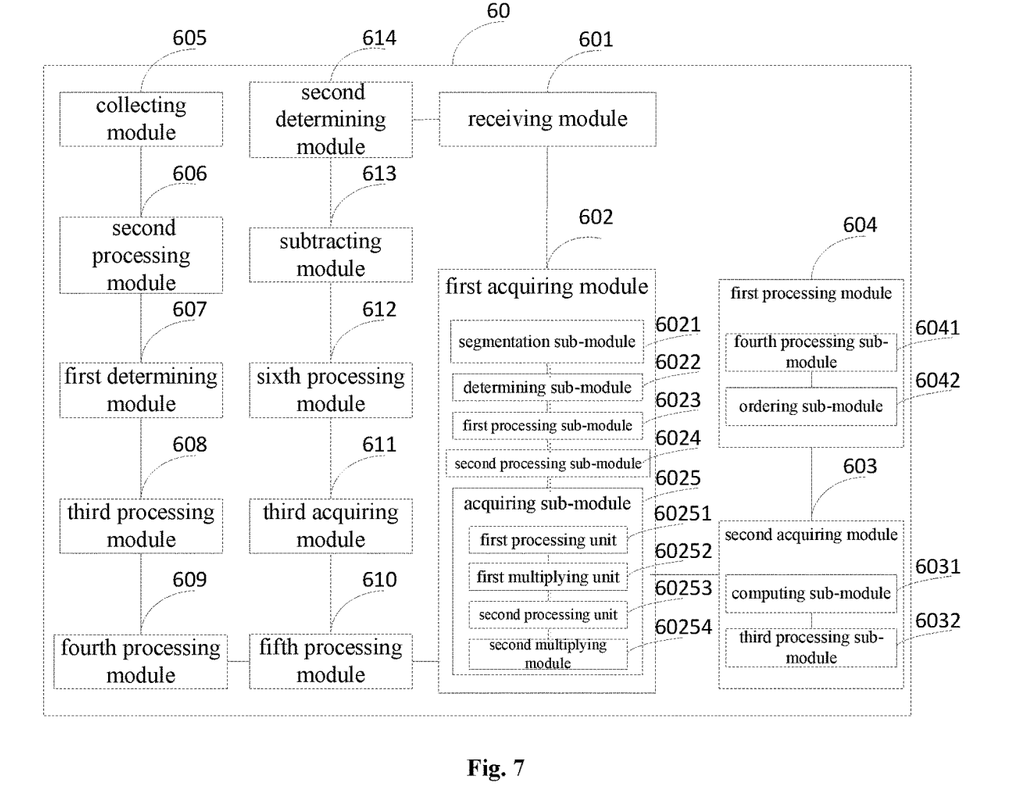
FIG. 7 is a block diagram of an apparatus for recalling a search result based on a neural network according to another embodiment of the present disclosure.

In some embodiments, as shown in FIG. 7, the apparatus 60 also includes following modules.

Alternatively, the first requiring module also includes: a segmentation sub-module 6021, configured to perform a segmentation on the query and the titles of the plurality of search results respectively so as to acquire a plurality of first segments corresponding to the query and a plurality of second segments corresponding to each of the titles of the plurality of search results; a determining sub-module 6022, configured to determine a plurality of first feature components corresponding to the plurality of first segments respectively according to a preset feature model, and to determine a plurality of second feature components corresponding to the plurality of second segments respectively according to the preset feature model; a first processing sub-module 6023, configured to add the plurality of first feature components so as to generate a first middle feature vector corresponding to the query; a second processing sub-module 6024, configured to add the plurality of second feature components so as to generate second middle feature vectors corresponding to the titles respectively; and an acquiring sub-module 6025, configured to acquire the first feature vector and the second feature vector output by a preset algorithm according to the first middle feature vector and the second middle feature vectors.

Alternatively, the acquiring sub-module 6025 also includes: a first processing unit 60251, configured to perform a nonlinear conversion on a plurality of first elements in the first middle feature vector according to the preset algorithm, and to generate a nonlinear conversed first middle feature vector conversed according to a plurality of nonlinear conversed first elements; a first multiplying unit 60252, configured to multiply a full connectivity matrix in the preset algorithm by the nonlinear conversed first middle feature vector so as to generate the first feature vector; a second processing unit 60253, configured to perform the nonlinear conversion on the plurality of second elements in the second middle feature vectors according to the preset algorithm, and to generate nonlinear conversed second middle feature vectors according to a plurality of nonlinear conversed second elements; and a second multiplying module 60254, configured to multiply the full connectivity matrix in the preset algorithm by the nonlinear conversed second middle feature vectors respectively so as to generate the second feature vectors.

Alternatively, the second acquiring module 603 also includes: a computing sub-module 6031, configured to compute the similarities between the first feature vector and the second feature vectors respectively; and a third processing sub-module 6032, configured to regard the similarities as the semantic matching scores between the query and the plurality of search results respectively.

Alternatively, the first processing module 604 includes: a fourth processing sub-module 6041, configured to input the semantic marching scores into an ordering model, and to acquire scored corresponding to the plurality of search results respectively output by the ordering model; and an ordering sub-module 6042, configured to order the plurality of search results according to the scores so as to determine a preset number of search results as the at least one target search result.

The apparatus 60 also includes: a collecting module 605, configured to collect a plurality of sample queries, and to collect the titles of a plurality of sample search results corresponding to the plurality of sample queries respectively; a second processing module 606, configured to perform the segmentation on the plurality of sample queries and the titles of the plurality of sample search results respectively so as to acquire a plurality of third segments corresponding to each of the plurality of sample queries and a plurality of fourth segments corresponding to each of the titles of the plurality of sample search results; a first determining module 607, configured to determine a plurality of third feature components corresponding to the plurality of third segments respectively, and to determine a plurality of feature components corresponding respectively to one or more of the plurality of fourth segments clicked by a user as fourth feature components and a plurality of feature components corresponding respectively to one or more of the plurality of fourth segments not clicked by the user as fifth feature components; a third processing module 608, configured to add the plurality of third feature components so as to generate third middle feature vectors corresponding to the plurality of sample queries respectively; a fourth processing module 609, configured to add the plurality of fourth feature components of each of the titles of the plurality of sample search results so as to generate fourth middle feature vectors corresponding to the one or more of the plurality of fourth segments clicked by the user; a fifth processing module 610, configured to add the plurality of fifth feature components of each of the titles of the plurality of sample search results so as to generate fifth middle feature vectors corresponding to the one or more of the plurality of fourth segments not clicked by the user; a third acquiring module 611, configured to acquire third feature vectors corresponding to the plurality of sample queries respectively, fourth feature vectors corresponding to the one or more of the plurality of fourth segments clicked by the user and fifth feature vectors corresponding to the one or more of the plurality of fourth segments not clicked by the user output by the preset algorithm according to the third middle feature vectors, the fourth middle feature vectors and the fifth middle feature vectors; a sixth processing module 612, configured to acquire first similarities between the third feature vectors and the fourth feature vectors respectively, and to acquire second similarities between the third feature vectors and the fifth feature vectors respectively; a subtracting module 613, configured to acquire differences between the first similarities and the second similarities, and to adjust the differences by adjusting weights of elements in the third feature vectors, the fourth feature vectors and the fifth feature vectors respectively; and a second determining module 614, configured to determine adjusted third feature vectors, adjusted fourth feature vectors and adjusted fifth feature vectors when the differences achieve target values, so as to establish the preset feature model.

It should be noted that the descriptions of the method for recalling a search result based on a neural network in embodiments of FIG. 1-FIG. 5 are also suitable for the apparatus 60 for recalling a search result based on a neural network, which will not be described in detail herein.

In this embodiment, a first feature vector corresponding to the query is acquired, second feature vectors corresponding respectively to titles of the plurality of search results are acquired, similarities between the first feature vector and the second feature vectors are acquired respectively, semantic matching scores between the query and the plurality of search results are acquired respectively according to the similarities, and at least one target search result from the plurality of search results is determined according to the semantic marching scores, in which the at least one target search result is regarded as the search result recalled according to the query. Thus, semantic matching degrees between the search results and the query may be enhanced, relevancies between the search results recalled and the query input by the user may be improved, and the requirements of the user may be satisfied.

It should be noted that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for recalling a search result based on a neural network, comprising:
receiving a query and collecting a plurality of search results corresponding to the query;
acquiring a first feature vector corresponding to the query, and acquiring second feature vectors corresponding to titles of the plurality of search results respectively;
acquiring similarities between the first feature vector and the second feature vectors respectively, and acquiring semantic matching scores between the query and the plurality of search results respectively according to the similarities; and
determining at least one target search result from the plurality of search results according to the semantic marching scores, wherein the at least one target search result is regarded as the search result recalled according to the query,
wherein acquiring a first feature vector corresponding to the query, and acquiring second feature vectors corresponding to titles of the plurality of search results respectively comprises:
performing a segmentation on the query and the titles of the plurality of search results respectively so as to acquire a plurality of first segments corresponding to the query and a plurality of second segments corresponding to each of the titles of the plurality of search results;

determining a plurality of first feature components corresponding to the plurality of first segments respectively according to a preset feature model, and determining a plurality of second feature components corresponding to the plurality of second segments respectively according to the preset feature model;

adding the plurality of first feature components so as to generate a first intermediate feature vector corresponding to the query;

adding the plurality of second feature components so as to generate second intermediate feature vectors corresponding to the titles respectively; and acquiring the first feature vector and the second feature vectors output by a preset algorithm according to the first intermediate feature vector and the second intermediate feature vectors, wherein acquiring the first feature vector and the second feature vectors output by a preset algorithm according to the first intermediate feature vector and the second intermediate feature vectors comprises:

performing a nonlinear conversion on a plurality of first elements in the first intermediate feature vector according to the preset algorithm, and generating a nonlinear conversed first intermediate feature vector according to a plurality of nonlinear conversed first elements;

multiplying a full connectivity matrix in the preset algorithm by the nonlinear conversed first intermediate feature vector so as to generate the first feature vector;

performing the nonlinear conversion on the plurality of second elements in the second intermediate feature vectors according to the preset algorithm, and generating nonlinear conversed second intermediate feature vectors according to a plurality of nonlinear conversed second elements; and multiplying the full connectivity matrix in the preset algorithm by the nonlinear conversed second intermediate feature vectors respectively so as to generate the second feature vectors.

2. The method according to claim 1, further comprising:
establishing the preset feature model before the query is received, comprising:
collecting a plurality of sample queries, and collecting the titles of a plurality of sample search results corresponding to the plurality of sample queries respectively;
performing the segmentation on the plurality of sample queries and the titles of the plurality of sample search results respectively so as to acquire a plurality of third segments corresponding to each of the plurality of sample queries and a plurality of fourth segments corresponding to each of the titles of the plurality of sample search results;
determining a plurality of third feature components corresponding to the plurality of third segments respectively, and determining a plurality of feature components corresponding respectively to one or more of the plurality of fourth segments clicked by a user as fourth feature components and a plurality of feature components corresponding respectively to one or more of the plurality of fourth segments not clicked by the user as fifth feature components;
adding the plurality of third feature components so as to generate third intermediate feature vectors corresponding to the plurality of sample queries respectively;
adding the plurality of fourth feature components of each of the titles of the plurality of sample search results so as to generate fourth intermediate feature vectors corresponding to the one or more of the plurality of fourth segments clicked by the user;
adding the plurality of fifth feature components of each of the titles of the plurality of sample search results so as to generate fifth intermediate feature vectors corresponding to the one or more of the plurality of fourth segments not clicked by the user;
acquiring third feature vectors corresponding to the plurality of sample queries respectively, fourth feature vectors corresponding to the one or more of the plurality of fourth segments clicked by the user and fifth feature vectors corresponding to the one or more of the plurality of fourth segments not clicked by the user output by the preset algorithm according to the third intermediate feature vectors, the fourth intermediate feature vectors and the fifth intermediate feature vectors;
acquiring first similarities between the third feature vectors and the fourth feature vectors respectively, and acquiring second similarities between the third feature vectors and the fifth feature vectors respectively;
acquiring differences between the first similarities and the second similarities respectively, and adjusting the differences by adjusting weights of elements in the third feature vectors, the fourth feature vectors and the fifth feature vectors respectively; and
determining adjusted third feature vectors, adjusted fourth feature vectors and adjusted fifth feature vectors when the differences achieve target values, so as to establish the preset feature model.

3. The method according to claim 2, wherein the similarities, the first similarities and the second similarities are cosine similarities.

4. The method according to claim 1, wherein acquiring similarities between the first feature vector and the second feature vectors respectively, and acquiring semantic matching scores between the query and the plurality of search results respectively according to the similarities comprises:
computing the similarities between the first feature vector and the second feature vectors respectively; and
regarding the similarities as the semantic matching scores between the query and the plurality of search results respectively.

5. The method according to claim 4, wherein the similarities are cosine similarities.

6. The method according to claim 1, wherein determining at least one target search result from the plurality of search results according to the semantic marching scores comprises:
inputting the semantic marching scores into an ordering model, and acquiring scores corresponding to the plurality of search results respectively output by the ordering model; and
ordering the plurality of search results according to the scores so as to determine a preset number of search results as the at least one target search result.

7. The method according to claim 1, wherein the similarities are cosine similarities.

8. An apparatus for recalling a search result based on a neural network, comprising:
one or more processors;
a memory storing instructions executable by the one or more processors;

wherein the one or more processors, via execution of the instructions, are configured to:

receive a query and to collect a plurality of search results corresponding to the query;

acquire a first feature vector corresponding to the query, and to acquire second feature vectors corresponding to titles of the plurality of search results respectively;

acquire similarities between the first feature vector and the second feature vectors respectively, and to acquire semantic matching scores between the query and the plurality of search results respectively according to the similarities; and determine at least one target search result from the plurality of search results according to the semantic marching scores, wherein the at least one target search result is regarded as the search result recalled according to the query, wherein the one or more processors are configured to perform following acts to acquire a first feature vector corresponding to the query, and to acquire second feature vectors corresponding to titles of the plurality of search results respectively:

performing a segmentation on the query and the titles of the plurality of search results respectively so as to acquire a plurality of first segments corresponding to the query and a plurality of second segments corresponding to each of the titles of the plurality of search results;

determining a plurality of first feature components corresponding to the plurality of first segments respectively according to a preset feature model, and determining a plurality of second feature components corresponding to the plurality of second segments respectively according to the preset feature model;

adding the plurality of first feature components so as to generate a first intermediate feature vector corresponding to the query;

adding the plurality of second feature components so as to generate second intermediate feature vectors corresponding to the titles respectively; and acquiring the first feature vector and the second feature vector output by a preset algorithm according to the first intermediate feature vector and the second intermediate feature vectors, wherein the one or more processors, via execution of the instructions, are configured to perform following acts to acquire the first feature vector and the second feature vector output by a preset algorithm according to the first intermediate feature vector and the second intermediate feature vectors:

performing a nonlinear conversion on a plurality of first elements in the first intermediate feature vector according to the preset algorithm, and generating a nonlinear conversed first intermediate feature vector according to a plurality of nonlinear conversed first elements;

multiplying a full connectivity matrix in the preset algorithm by the nonlinear conversed first intermediate feature vector so as to generate the first feature vector;

performing the nonlinear conversion on the plurality of second elements in the second intermediate feature vectors according to the preset algorithm, and generating nonlinear conversed second intermediate feature vectors according to a plurality of nonlinear conversed second elements; and multiplying the full connectivity matrix in the preset algorithm by the nonlinear conversed second intermediate feature vectors respectively so as to generate the second feature vectors.

9. The apparatus according to claim 8, wherein the one or more processors, via execution of the instructions, are further configured to:

collect a plurality of sample queries, and collect the titles of a plurality of sample search results corresponding to the plurality of sample queries respectively;

perform the segmentation on the plurality of sample queries and the titles of the plurality of sample search results respectively so as to acquire a plurality of third segments corresponding to each of the plurality of sample queries and a plurality of fourth segments corresponding to each of the titles of the plurality of sample search results;

determine a plurality of third feature components corresponding to the plurality of third segments respectively, and determine a plurality of feature components corresponding respectively to one or more of the plurality of fourth segments clicked by a user as fourth feature components and a plurality of feature components corresponding respectively to one or more of the plurality of fourth segments not clicked by the user as fifth feature components;

add the plurality of third feature components so as to generate third intermediate feature vectors corresponding to the plurality of sample queries respectively;

add the plurality of fourth feature components of each of the titles of the plurality of sample search results so as to generate fourth intermediate feature vectors corresponding to the one or more of the plurality of fourth segments clicked by the user;

add the plurality of fifth feature components of each of the titles of the plurality of sample search results so as to generate fifth intermediate feature vectors corresponding to the one or more of the plurality of fourth segments not clicked by the user;

acquire third feature vectors corresponding to the plurality of sample queries respectively, fourth feature vectors corresponding to the one or more of the plurality of fourth segments clicked by the user and fifth feature vectors corresponding to the one or more of the plurality of fourth segments not clicked by the user output by the preset algorithm according to the third intermediate feature vectors, the fourth intermediate feature vectors and the fifth intermediate feature vectors;

acquire first similarities between the third feature vectors and the fourth feature vectors respectively, and acquire second similarities between the third feature vectors and the fifth feature vectors respectively;

acquire differences between the first similarities and the second similarities, and adjust the differences by adjusting weights of elements in the third feature vectors, the fourth feature vectors and the fifth feature vectors respectively; and determine adjusted third feature vectors, adjusted fourth feature vectors and adjusted fifth feature vectors when the differences achieve target values, so as to establish the preset feature model.

10. The apparatus according to claim 9, wherein the similarities, the first similarities and the second similarities are cosine similarities.

11. The apparatus according to claim 8, wherein the one or more processors, via execution of the instructions, are configured to perform following acts to acquire similarities between the first feature vector and the second feature vectors respectively, and to acquire semantic matching scores between the query and the plurality of search results respectively according to the similarities:
- computing the similarities between the first feature vector and the second feature vectors respectively; and
- regarding the similarities as the semantic matching scores between the query and the plurality of search results respectively.

12. The apparatus according to claim 11, wherein the similarities are cosine similarities.

13. The apparatus according to claim 8, wherein the one or more processors, via execution of the instructions, are configured to perform following acts to determine at least one target search result from the plurality of search results according to the semantic marching scores:
- inputting the semantic marching scores into an ordering model, and acquiring scored corresponding to the plurality of search results respectively output by the ordering model; and
- ordering the plurality of search results according to the scores so as to determine a preset number of search results as the at least one target search result.

14. The apparatus according to claim 8, wherein the similarities are cosine similarities.

15. A non-transitory computer-readable storage medium having stored therein instructions that, when executed by a processor of a device, cause the processor to perform a method for recalling a search result based on a neural network, the method comprising:
- receiving a query and collecting a plurality of search results corresponding to the query;
- acquiring a first feature vector corresponding to the query, and acquiring second feature vectors corresponding to titles of the plurality of search results respectively;
- acquiring similarities between the first feature vector and the second feature vectors respectively, and acquiring semantic matching scores between the query and the plurality of search results respectively according to the similarities; and
- determining at least one target search result from the plurality of search results according to the semantic marching scores, wherein the at least one target search result is regarded as the search result recalled according to the query,
- wherein acquiring a first feature vector corresponding to the query, and acquiring second feature vectors corresponding to titles of the plurality of search results respectively comprises:
  - performing a segmentation on the query and the titles of the plurality of search results respectively so as to acquire a plurality of first segments corresponding to the query and a plurality of second segments corresponding to each of the titles of the plurality of search results;
  - determining a plurality of first feature components corresponding to the plurality of first segments respectively according to a preset feature model, and determining a plurality of second feature components corresponding to the plurality of second segments respectively according to the preset feature model;
  - adding the plurality of first feature components so as to generate a first intermediate feature vector corresponding to the query;
  - adding the plurality of second feature components so as to generate second intermediate feature vectors corresponding to the titles respectively; and
  - acquiring the first feature vector and the second feature vectors output by a preset algorithm according to the first intermediate feature vector and the second intermediate feature vectors,
- wherein acquiring the first feature vector and the second feature vectors output by a preset algorithm according to the first intermediate feature vector and the second intermediate feature vectors comprises:
  - performing a nonlinear conversion on a plurality of first elements in the first intermediate feature vector according to the preset algorithm, and generating a nonlinear conversed first intermediate feature vector according to a plurality of nonlinear conversed first elements;
  - multiplying a full connectivity matrix in the preset algorithm by the nonlinear conversed first intermediate feature vector so as to generate the first feature vector;
  - performing the nonlinear conversion on the plurality of second elements in the second intermediate feature vectors according to the preset algorithm, and generating nonlinear conversed second intermediate feature vectors according to a plurality of nonlinear conversed second elements; and
  - multiplying the full connectivity matrix in the preset algorithm by the nonlinear conversed second intermediate feature vectors respectively so as to generate the second feature vectors.

* * * * *